United States Patent
Tomiyori

[11] Patent Number: 5,890,780
[45] Date of Patent: Apr. 6, 1999

[54] POWER SUPPLY SWITCHING APPARATUS WITH PROTECTION FUNCTION FOR SUPPLYING POWER TO AN ELECTRONIC CIRCUIT VIA AN EXTERNAL POWER SOURCE OR AN INTERNAL POWER SUPPLY SOURCE

[75] Inventor: Yutaka Tomiyori, Tokyo, Japan

[73] Assignee: NEC Corporation, Tokyo, Japan

[21] Appl. No.: 946,357

[22] Filed: Oct. 7, 1997

[30] Foreign Application Priority Data

Oct. 7, 1996 [JP] Japan ................................. 8-266113

[51] Int. Cl.$^6$ ........................................ H02J 1/00
[52] U.S. Cl. ............................ 307/86; 361/78; 361/79; 361/88; 320/132; 320/136
[58] Field of Search ............................. 361/78–79, 88, 361/90–93; 320/132, 134, 136, 121; 307/74, 75, 80, 85, 86, 87, 126, 130, 131, 140

[56] References Cited

U.S. PATENT DOCUMENTS

| | | | |
|---|---|---|---|
| 5,291,365 | 3/1994 | Takagi | 361/56 |
| 5,523,669 | 6/1996 | Oku et al. | 320/14 |
| 5,554,919 | 9/1996 | Uchida | 320/14 |
| 5,684,381 | 11/1997 | Ohtsuka | 320/5 |
| 5,686,767 | 11/1997 | Helfrich et al. | 307/64 |

FOREIGN PATENT DOCUMENTS 58-645  1/1983  Japan .

OTHER PUBLICATIONS

Battery Protection IC, S–8491 series, Seiko Instruments, Inc, May 10, 1995, pp. 1–19.

*Primary Examiner*—Jeffrey Gaffin
*Assistant Examiner*—Kim Huynh
*Attorney, Agent, or Firm*—Sughrue, Mion, Zinn, Macpeak & Seas, PLLC

[57] ABSTRACT

A power supply switching apparatus for electronic equipment including a first control circuit connected to a battery. The first control circuit monitors a power supply voltage of the battery to output a first control signal when the power supply voltage of the battery is lower than a first predetermined voltage. The first control circuit also outputs a second control signal when the power supply voltage of the battery is higher than a second predetermined voltage. A second control circuit monitors whether power is supplied from an external power supply to the electronic equipment, to generate a third control signal when the power is not supplied from the external power supply. The second control circuit generates the third control signal regardless of whether the second control signal is present, when power is supllied from the external power supply. A switching circiut section supplies power from the battery to the internal circuit when the first and third control signals are not present. The switching circuit section disconnects the battery from the internal circuit in response to the first or third control signal.

20 Claims, 3 Drawing Sheets

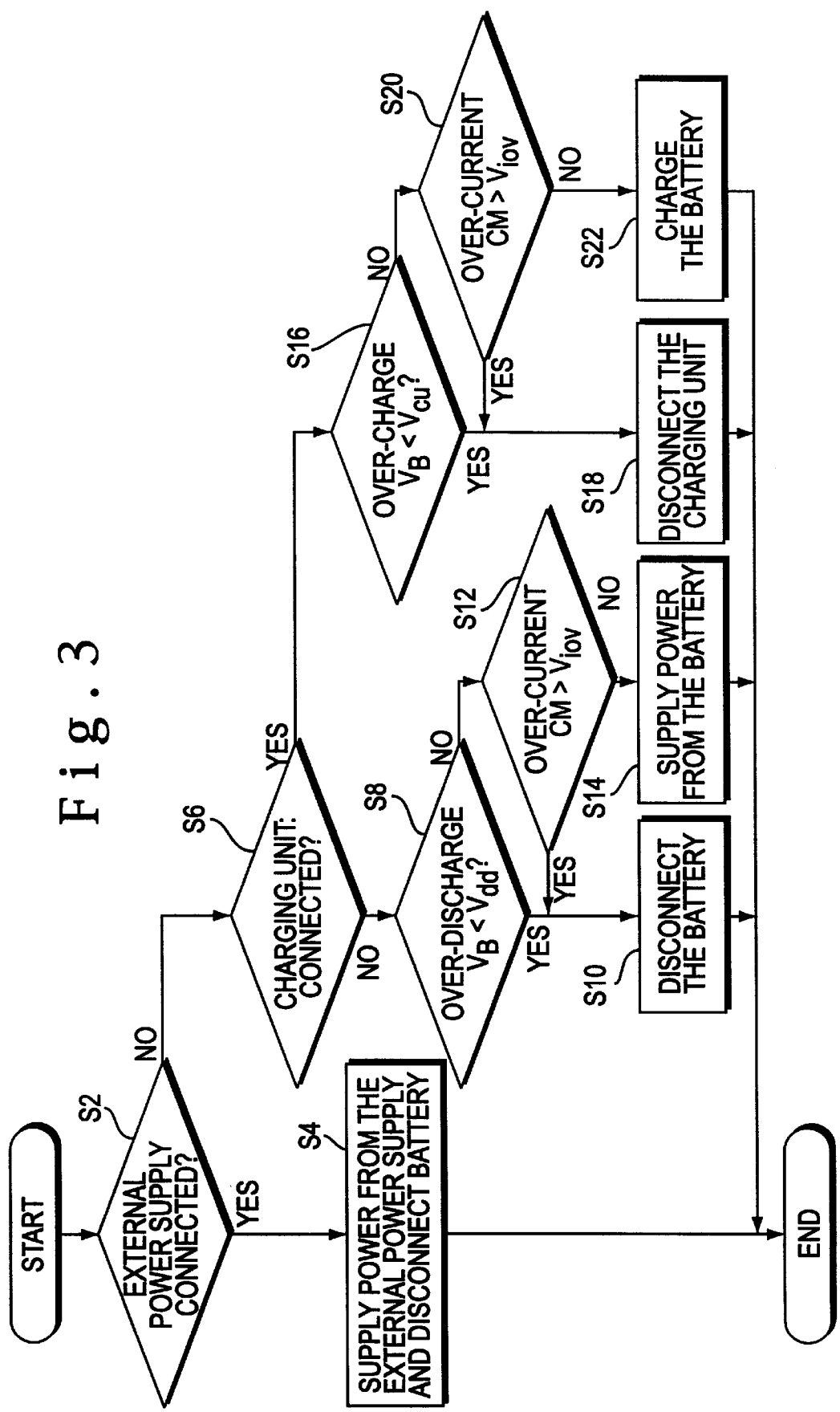

POWER SUPPLY SWITCHING APPARATUS WITH PROTECTION FUNCTION FOR SUPPLYING POWER TO AN ELECTRONIC CIRCUIT VIA AN EXTERNAL POWER SOURCE OR AN INTERNAL POWER SUPPLY SOURCE

BACKGROUND OF THE INVENTION

1. Field of the Invention

The present invention relates to a power supply switching circuit, and more particularly to a power supply switching circuit with a protection function, which can selectively receive power from a built-in secondary battery cell and power from an external power supply.

2. Description of the Related Art

There is known, electronic equipment which can operate based on power supplied from an external power supply and power supplied from a secondary battery built into the electronic equipment. In such electronic equipment, it is possible than when power is supplied from the external power supply, an; over-voltage which exceeds an adequate charging voltage for the secondary battery is applied to the secondary battery. In this case, the secondary battery is not charged properly. Therefore, there is the possibility that the electronic equipment is set in a dangerous state due to generation of heat and so on.

In order to avoid such a dangerous state, the electronic equipment may include a switching circuit for switching a power supply source between the secondary battery and the external power supply. Such a switching circuit may be composed of a relay, a transistor switch, a mechanical switch or the like. Alternatively, the switching circuit might be realized by ON/OFF switches respectively provided in parallel for power supply lines for the secondary battery and the external power supply, and to turn on either one of the switches.

On the other hand, in the charging operation of a secondary battery cell, an over-voltage protection circuit or an over-discharge protection circuit may be provided to detect the above-mentioned extraordinary charging state to the secondary battery cell. The protection circuit would electrically disconnect the secondary battery cell in the event of an extraordinary charging state. It is desirable that these protection circuits are composed of a detecting circuit for detecting that the over-voltage state or the over-discharge state is present, and a switching circuit which is controlled based on the detection result by the detecting circuit to electrically disconnect the secondary battery cell.

However, if the power supply switching circuit and the secondary battery cell protection circuit are provided independently, there are multi-stage switch circuits in series in the power supply line of the electronic equipment. This becomes disadvantageous in the small size and weight of the electronic equipment. This problem is especially conspicuous in a portable communication terminal comprising the electronic equipment.

Also, the resistances of respective switch circuits are added on the power supply line. As a result, the series resistance of the power supply line increases, so that the line voltage descreases because of operation current to the equipment, and power supply noise increases, resulting in degradation of the performance of the electronic equipment.

The power supply switching method when AC power is supplied from the external power supply is disclosed in, for example, Japanese Laid Open Utility Model Disclosure (JP-U-Show a 58-645). In the method, the connection of the external power supply is detected and then a power supply line is switched. In this example, however, the charging operation protection of the secondary battery cell is not considered. When the charging operation protection is considered, because the double switch structure becomes necessary, the above-mentioned problems will be present.

SUMMARY OF THE INVENTION

The present invention is provided in the view of above-mentioned problems. An object of the present invention is to provide a power supply switching circuit which is improved to solve the above-mentioned problems.

Another object of the present invention is to provide a power supply switching circuit in which power supply switching and secondary battery cell protection can be both performed without greatly increasing equipment volume.

Still another object of the present invention is to provide a method of switching between power supplies while maintaining secondary battery cell protection.

In order to achieve an aspect of the present invention, a power supply switching apparatus for an electronic equipment includes a battery, a first control circuit operatively connected in parallel to the battery and having a first control terminal. The first control circuit monitors a power supply voltage of the battery, and outputs a first control signal from the first control terminal when it is detected that the power supply voltage of the battery is lower than a first predetermined voltage. A second control circuit monitors whether power is supplied from an external power supply to internal power supply lines of an internal circuit of the electronic equipment. The second control circuit generates a second control signal when it is detected that the power is supplied from the external power supply to the internal power supply lines of the internal circuit. A switching circuit section supplies power from the battery to the internal power supply lines of the internal circuit of the electronic equipment when the first and second control signals are not present. The switching circuit further electrically disconnects the battery from the internal power supply lines of the internal circuit in response to the first control signal when the second control signal is not present, and electrically disconnects the battery from the internal power supply lines of the internal circuit in response to the second control signal, regardless of the first control signal.

When the power is supplied from the external power supply via an external power supply terminal and an external ground terminal, the second control circuit includes a resistor connected between the external power supply terminal and the external ground terminal, and an inverter having an input connected to the external power supply terminal to generate the second control signal.

The power supply switching apparatus may further include a prevention diode having an anode connected to the external power supply terminal and a cathode connected to a power supply line of the internal power supply lines.

The first control circuit may further include a current detection terminal. The first control circuit detects via the current detection terminal a current flowing from and into the battery and generates the first control signal when the detected current is larger than a predetermined current.

In order to achieve another aspect of the present invention, a power supply switching apparatus for an electronic equipment includes a secondary battery, a first control circuit operatively connected in parallel to the battery and having a first control terminal and a second control terminal.

The first control circuit monitors a power supply voltage of the secondary battery, and outputs a first control signal from the first control terminal when it is detected that the power supply voltage of the secondary battery is lower than a first predetermined voltage. The first control circuit outputs a second control signal from the second control terminal when it is detected that the power supply voltage of the secondary battery is higher than a second predetermined voltage. A second control circuit monitors whether power is supplied from an external power supply to internal power supply lines of an internal circuit of the electronic equipment, and generates a third control signal when it is detected that the power is supplied from the external power supply to the internal power supply lines of the internal circuit. The second control signal is output as the third control signal when it is detected that the power is not supplied from the external power supply to the internal power supply lines of the internal circuit. The second control circuit generates the third control signal regardless of whether the second control signal is present, when it is detected that the power is supplied from the external power supply to the internal power supply lines of the internal circuit. A switching circuit section supplies a power from the secondary battery to the internal power supply lines of the internal circuit of the electronic equipment when the first and third control signals are not present. The switching circuit electrically disconnects the secondary battery from the internal power supply lines of the internal circuit in response to the first control signal regardless of the third control signal, and electrically disconnects the secondary battery from the internal power supply lines of the internal circuit in response to the third control signal, regardless of the first control signal.

The power is supplied from the external power supply via an external power supply terminal and an external ground terminal, and a ground line of the internal power supply lines is connected to the external ground terminal. In this case, the second control circuit includes a first resistor connected between the external power supply terminal and the external ground terminal, an inverter having an input connected to the external power supply terminal, a second resistor connected between the second control terminal of the first control circuit and the external ground terminal, and an AND gate having an input connected to the second control terminal and an input connected to an output of the inverter, to output the third control signal.

A charger unit may be connected between a charging terminal and the external ground terminal such that the secondary battery can be charged via the switching circuit. In this case, a positive terminal of the secondary battery is connected to a power supply line of the internal power supply lines. In addition, the switching circuit includes a first diode having an anode connected to the negative terminal of the secondary battery, a second diode having a cathode connected to a cathode of the first diode and an anode connected to the ground line of the internal power supply lines, a first switching element connected to the first diode in parallel and turning off in response to the first control signal, and a second switching element connected to the second diode in parallel and turning off in response to the third control signal.

The power supply switching apparatus may further include a prevention diode having an anode connected to the external power supply terminal and a cathode connected to the power supply line of the internal power supply lines. The power supply switching apparatus may further include a prevention diode having an anode connected to the charging terminal and a cathode connected to the power supply line of the internal power supply lines.

When the first control circuit further includes a current detection terminal, the first control circuit detects via the current detection terminal a current flowing from and into the battery, and generates the first and second control signal when the detected current is larger than a predetermined current.

In order to achieve still another aspect of the present invention, a method of switching between power supply for an electronic equipment includes:

monitoring a power supply voltage of a battery;

generating a first control signal when it is detected that the power supply voltage of the battery is lower than a first predetermined voltage;

monitoring whether an external power supply is connected;

generating a second control signal when it is detected that the external power supply is connected;

normally supplying a power from the battery to the internal circuit of the electronic equipment when the first and second control signals are not present;

electrically disconnecting the battery from the internal circuit in response to the first control signal when the second control signal is not present; and electrically disconnecting the battery from the internal circuit in response to the second control signal, regardless of the first control signal.

BRIEF DESCRIPTION OF THE DRAWINGS

FIG. 3 is a flow chart to explain the operation of the power supply switching circuit in the embodiment.

DESCRIPTION OF THE PREFERRED EMBODIMENTS

Next, the power supply switching circuit of the present invention will be described in detail with reference to the accompanying drawings.

Figure 1:
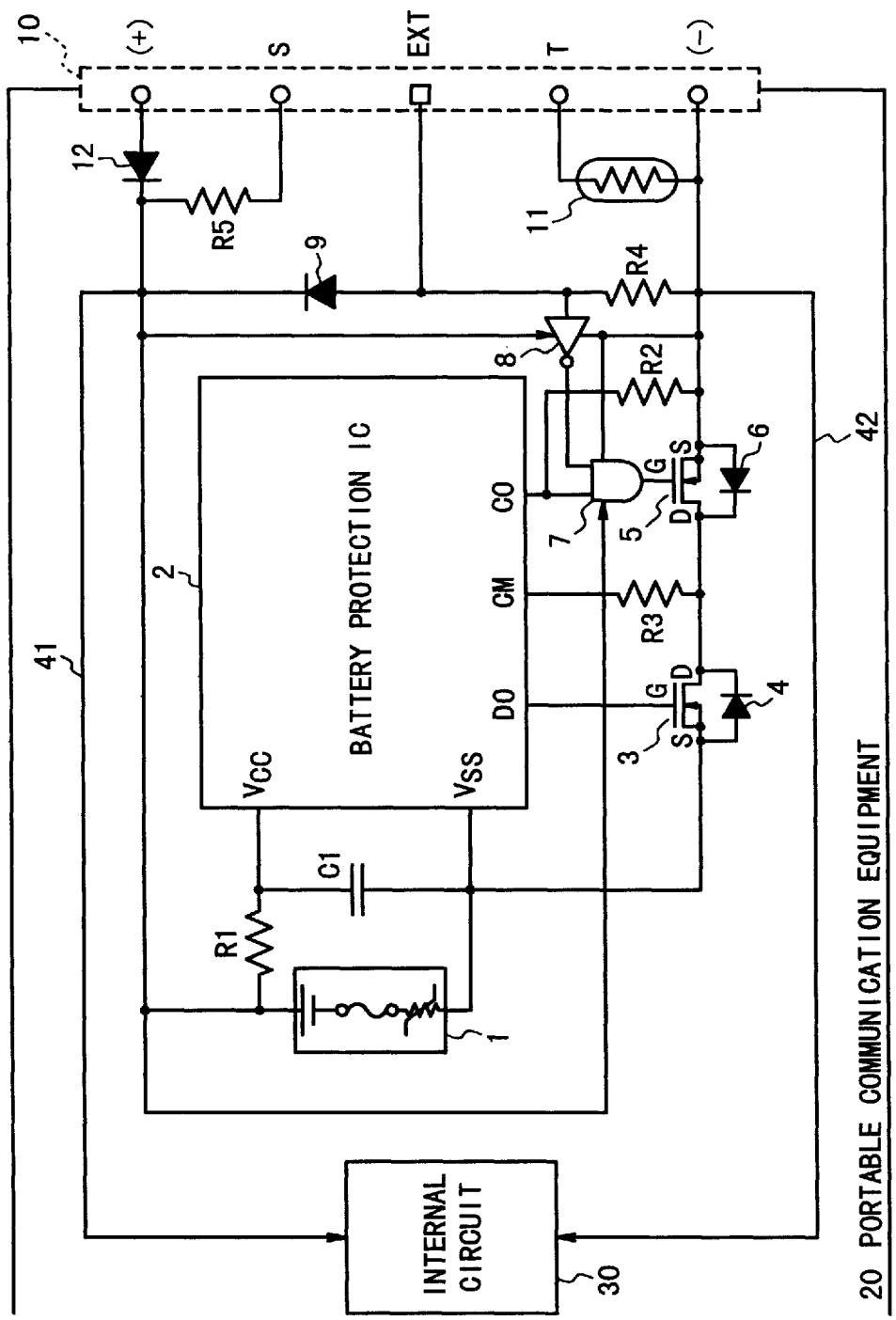
FIG. 1 is a circuit diagram illustrating the structure of a power supply switching circuit according to an embodiment of the present invention.

FIG. 1 is a diagram illustrating the structure of the power supply switching circuit according to an embodiment of the present invention. Referring to FIG. 1, the power supply switching circuit as well as a secondary battery cell 1 such as a lithium ion secondary battery cell is built in an electronic equipment 20 such as a portable communication equipment. The electronic equipment 20 has an external power supply terminal 10 which is composed of a charging unit connection terminal (+), a charging voltage monitor terminal S, an external power supply connection terminal EXT, a temperature monitor terminal T and a ground terminal (-) The secondary battery cell supplies power to an internal circuit 30 of the electronic equipment 20 on internal power supply lines 41 and 42 via the power supply switching circuit.

Figure 2:
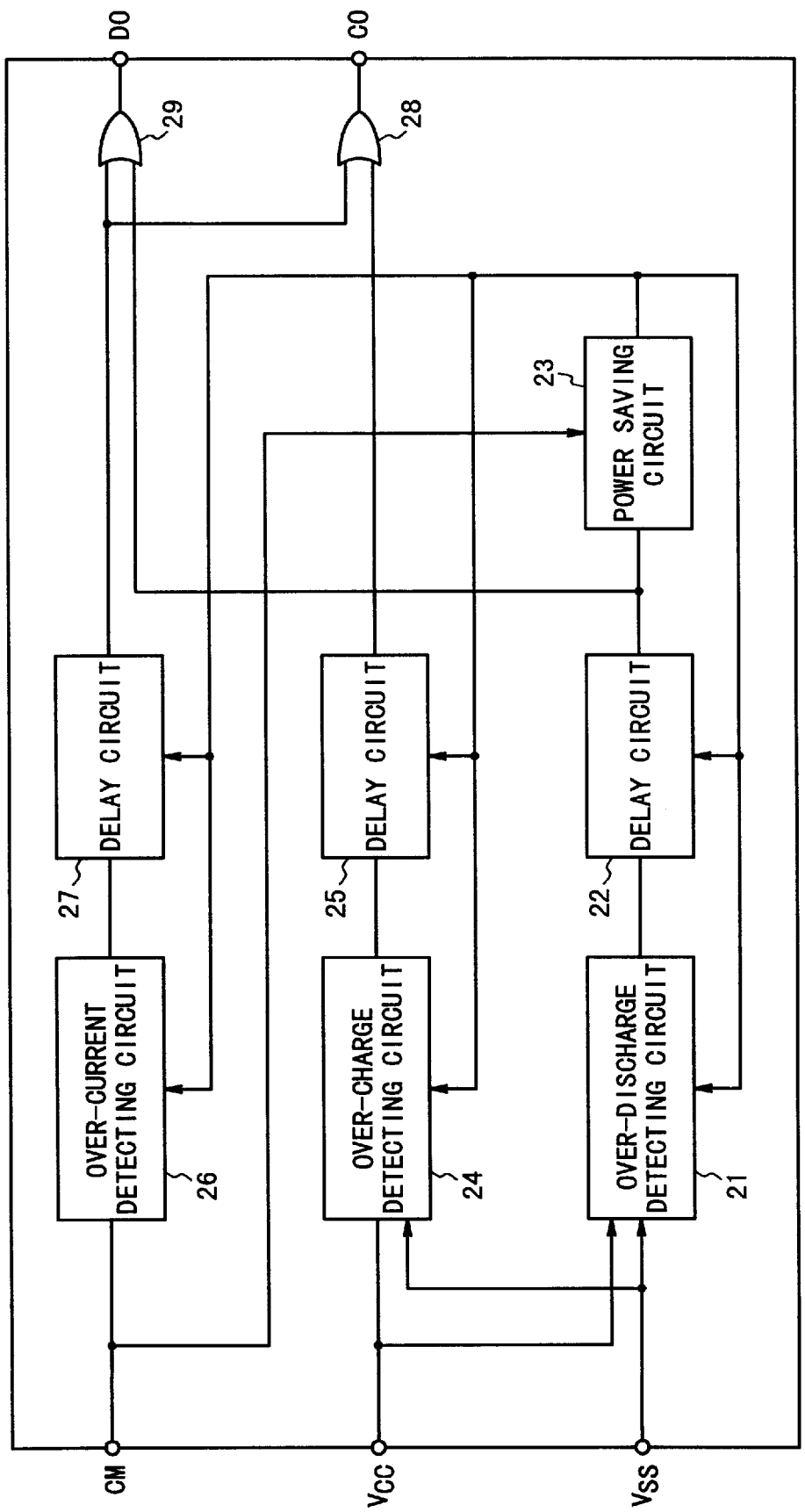
FIG. 2 is a block diagram illustrating the structure of a battery protection IC used in the power supply switching circuit in the embodiment.

The power supply switching circuit according to the embodiment of the present invention is composed of a battery protection IC 2. As the battery protection IC 2, the IC such as S-8491 commercially available from SEIKO INSTRUMENTS Inc. can be used. The battery protection IC 2 has a DO terminal, a CO terminal and a CM terminal in addition to a Vcc terminal and a Vss terminal. The battery voltage monitoring terminals Vcc and Vss are operatively connected to the positive terminal and ground terminal of the secondary battery cell 1. The battery protection IC 2 detects an over-voltage state and over-discharge state of the secondary battery cell 1 from the voltage between the terminals Vcc and Vss. Also, the battery protection IC 2 detects an over-current state from or into the secondary battery cell 1 from input to the terminal CM. The DO terminal is used for controlling the over-discharging operation of the secondary battery cell 1, and the CO terminal used for the charging operation of the secondary battery cell 1. The internal circuit structure of S-8491 as the battery protection IC is shown in FIG. 2. Because the structure and operation of the battery protection IC are known, the brief description is given below.

In this embodiment, when the power supply voltage of the secondary battery cell 1 is higher than an over-discharge detection voltage Vdd and lower than an over-charge detection voltage Vcu, and when the voltage at the CM terminal is lower than an over-current detection voltage Viov, the power supply switching circuit is in a normal operation state. When the power supply voltage of the secondary battery cell 1 is higher than the over-charge detection voltage Vcu, the power supply switching circuit is in an over-charge state. When the power supply voltage of the secondary battery cell 1 is lower than the over-discharge detection voltage Vdd, the power supply switching circuit is in an over-discharge state. When the voltage at the CM terminal is higher than the over-current detection voltage Viov, the power supply switching circuit is in an over-current state. The determination of the status of the with reference to the flow chart of FIG. 3. electronic equipment based on reference levels Viov, Vdd and Vcu are provided in greater detail The battery protection IC 2 outputs control signals from the DO terminal and the CO terminal. That is, when the over-charge state or the over-current state is detected, the battery protection IC 2 opens the CO terminal. When the over-discharge state or the over-current state is detected, the battery protection IC 2 sets the DO terminal to a ground level. The battery protection IC 2 outputs the "H" level from the CO terminal and the "H" level from the DO terminal in the normal operation state.

Referring to FIG. 1 again, in the power supply switching circuit of the present invention, the Vcc terminal of the battery protection IC 2 is connected to the positive (+) electrode of the secondary battery cell 1 through a resistor R1. The positive electrode of the secondary battery cell 1 is connected to a positive power supply line 41 of the power supply lines 41 and 42. The Vss terminal of the battery protection IC 2 is connected to the negative (−) electrode of the secondary battery cell 1. A capacitor C1 is connected between a node between the Vcc terminal and the Vss terminal.

Also, the power supply switching circuit includes a switching circuit composed of N channel MOS transistors 3 and 5, and diodes 4 and 6. The gate of the MOS transistor 3 is connected to the DO terminal of the battery protection IC 2 and the source is connected to the Vss terminal of the battery protection IC 2. The drain of the MOS transistor 3 is connected to the drain of the MOS transistor 5. A node between the drains of the MOS transistors 3 and 5 is connected to the CM terminal of the battery protection IC 2 via a resistor R3. The source of the MOS transistor 5 is connected to the ground terminal (−) of the external terminal 10 and a ground line 42 of the internal power supply lines. The diode 4 is connected in parallel to the MOS transistor 3 such that the anode is connected to the Vss terminal of the battery protection IC 2. The diode 6 is connected in parallel to the MOS transistor 4 such that the anode is connected to the ground terminal (−) of the external terminal 10.

Also, the power supply switching circuit includes a switching control circuit composed of resistors R2 and R4, an inverter 8 and an AND gate 7. The resistor R2 is connected between the CO terminal of the battery protection IC 2 and the ground terminal (−) of the external terminal 10. The resistor R4 is connected between the external power supply connection terminal EXT and the ground terminal (−) in the external terminal 10. The input of the inverter 8 is connected to the external power supply connection terminal EXT. One input of the AND gate 7 is connected to the CO terminal of the battery protection IC 2 and the other input of the AND gate 7 is connected to the output of the inverter 8. The output of the AND gate 7 is connected to the gate of the MOS transistor 5.

The MOS transistor 3 is controlled when the battery protection IC 2 detects the over-current state or the over-discharge state. The MOS transistor 5 is controlled when the battery protection IC 2 detects the over-charge state or the over-current, or when power is supplied from an external power supply.

It should be noted that the above MOS transistor switches only show an example. A structure which has the above-mentioned function may be used other than the switch shown in the figure.

The power supply switching circuit further includes a protection and monitor section. The protection and monitor section is composed of a diode 9 connected between the external power supply connection terminal EXT and the positive line 41 and a diode 12 connected between the charging unit connection terminal (+) and the positive line 41. The protection and monitor section is further composed of a resistor R5 connected between the cathode of the diode 12 and the voltage monitor terminal S, and a thermistor 11 connected between the ground terminal (−) and the temperature monitor terminal T.

Next, the operation of the power supply switching circuit shown in FIG. 1 will be described in detail with reference to FIG. 3.

In a step S2, it is determined whether power is supplied from a DC external power supply. The DC external power supply is connected between the external power supply connection terminal EXT and the ground terminal (−) in the external terminal 10. When the external power supply is connected to the external terminal 10, the power is supplied from the external power supply to the internal circuit 30 and the secondary battery cell 1 is disconnected from the internal circuit 30 in step S4. That is, a voltage from the external power supply is applied to the resistor R4. Thus, the inverter 8 outputs a low level. Therefore, regardless of first and second control signals from the DO and CO terminals of the battery protection IC 2, the AND gate outputs a low level as the third control signal. As a result, the MOS transistor 5 is turned off so that the secondary battery cell 1 is disconnected from the internal circuit 30 of the electronic equipment 20. The power from the external power supply is supplied to the internal circuit 30 via the diode 9. When the external power supply connection terminal EXT and the ground terminal (−) are shorted, the diode 9 prevents current from the secondary battery cell 1 from being supplied to such a shorted-circuit.

When it is determined that the external power supply is not connected, it is determined in a step S6 whether a charging unit is connected to the charging unit connection terminal (+) and the ground terminal (−) in the external terminal 10.

If the charging unit is not connected to the external terminal 10, it is determined in a step S8 whether the secondary battery cell 1 is in the over-discharge state. This is performed by monitoring the power supply voltage of the secondary battery cell 1, i.e., a voltage between the terminals Vcc and Vss by the battery protection IC 2. When the secondary battery cell 1 is in the over-discharge state (i.e. VB<Vdd), the first control signal of a low level is outputted from the DO terminal in a step S10. Therefore, the MOS transistor 3 is turned off so that the secondary battery cell 1 is electrically disconnected from the internal circuit 30.

If the secondary battery cell 1 is not in the over-discharge state, it is determined in a step S12 whether the power supply switching circuit is in an over-current state using the CM terminal (i.e. CM>Vior). When the power supply switching circuit is in an over-current state, the first control signal of the low level is outputted from the DO terminal and the second terminal CO is opened. Therefore, the MOS transistor 3 is turned off. Also, the input of the AND gate connected with the resistor R2 is set to the low level. Thus, the AND gate 7 outputs the low level as the third control signal. As a result, the MOS transistor 5 is turned off. However, because the diode 6 is provided, the MOS transistor 5 has no relation to the disconnection of the secondary battery cell 1. The secondary battery cell 1 is disconnected from the internal circuit 30 by the MOS transistor 3.

On the other hand, when it is determined that the secondary battery cell 1 is not in the overcurrent state, the power is supplied from the secondary battery cell 1 to the internal circuit 30 in a step S14. At this time, the first and second control signals are not supplied. That is, high level signals are outputted from the DO terminal and the CO terminal. In this case, two inputs of the AND gate 7 are both in the high level, because the external power supply is not connected and the high level is outputted from the CO terminal. Thus, the AND gate 7 outputs the high level.

In this manner, a DC current flows from the secondary battery cell 1 through the positive line 41, the internal circuit 30, a ground line 42, the diode 6 and the MOS transistor 3.

On the other hand, when it is determined in the step S6 that the charging unit is connected to the external terminal 10, it is determined in a step S16 whether the secondary battery cell 1 is in the over-charge state (i.e. VB>Vcu). When it is determined that the secondary battery cell 1 is in the over-charge state, the secondary battery cell 1 is disconnected from the charging unit in a step S18. That is, when the secondary battery cell 1 is disconnected from the charging unit, the second control signal is outputted from the CO terminal, i.e., the CO terminal is opened, the AND gate 7 outputs the low level as the third control signal. As a result, the MOS transistor 5 is turned off so that the secondary battery cell is disconnected from the charging unit.

On the other hand, When it is determined that the secondary battery cell 1 is not in the over-charge state, it is determined in a step S20 whether the secondary battery cell 1 is in the over-current state. this determination is performed as in the step S20. As a result, when the secondary battery cell 1 is in the over-charge state, the secondary battery cell 1 is disconnected from the charging unit in the step S18.

On the other hand, when the secondary battery cell 1 is not in the over-charge state, the normal charging operation is executed in a step S22. At this time, the first to third control signal is not outputted. That is, a DC current flows from the charging unit through the diode 12, the secondary battery cell 1, the diode 4 and the MOS transistor 5. Also, the power from the charging unit is supplied to the internal circuit 30 through the charging unit connection terminal (+), the positive line 41, the internal circuit 30, the ground line 42 and the ground terminal (−).

In this case, the diode 12 prevents that rapid discharge is performed from the secondary battery 1, when the charging unit connection terminal (+) and the ground terminal (−) are shorted.

In the above-mentioned embodiment, the description is given using the secondary battery built in the equipment body. However, the present invention is not limited to this. The secondary battery may be a chargeable and detachable secondary battery cell.

Also, even if the external power supply and the charging unit are used at a time, there is no problem in this embodiment, because the MOS transistor 5 is turned off and the diode 12 is provided.

As described above, according to the present invention, the power supply switching circuit has a function to switch power supply between the built-in secondary battery cell and the external power supply. Also, the power supply switching circuit has a protection function which avoids the situation where improper charging voltage and current are applied to the builtin secondary battery cell. Therefore, the power supply switching circuit satisfies the both functions and can restrain the increase of the series resistance of the power supply line, the equipment volume and the cost to a minimum.

What is claimed is:

1. A power supply switching apparatus for an electronic equipment comprising:
    a battery;
    a first control circuit operatively connected in parallel to said battery and having a first control terminal, wherein said first control circuit monitors a power supply voltage of said battery, and outputs a first control signal from said first control terminal when it is detected that said power supply voltage of said battery is lower than a first predetermined voltage;
    a second control circuit for monitoring whether a power is supplied from an external power supply to internal power supply lines of an internal circuit of said electronic equipment, and for generating a second control signal when it is detected that the power is supplied from said external power supply to said internal power supply lines of said internal circuit; and
    a switching circuit section for supplying a power from said battery to said internal power supply lines of said internal circuit of said electronic equipment when the first and second control signals are not present, for electrically disconnecting said battery from said internal power supply lines of said internal circuit in response to the first control signal when the second control signal is not present, and for electrically disconnecting said battery from said internal power supply lines of said internal circuit in response to the second control signal, regardless of the first control signal.

2. A power supply switching apparatus according to claim 1, wherein the power is supplied from said external power supply via an external power supply terminal and an external ground terminal, and
    wherein said second control circuit includes:
        a resistor connected between said external power supply terminal and said external ground terminal; and
        an inverter having an input connected to said external power supply terminal to generate said second control signal.

3. A power supply switching apparatus according to claim 2, further comprising a prevention diode having an anode connected to said external power supply terminal and a cathode connected to a power supply line of said internal power supply lines.

4. A power supply switching apparatus according to claim 1, wherein said first control circuit further includes a current detection terminal, wherein said first control circuit detects via said current detection terminal a current flowing from and into said battery and generates said first control signal when the detected current is larger than a predetermined current.

5. A power supply switching apparatus according to claim 1, wherein said power supply switching apparatus is built in said electronic equipment.

6. A power supply switching apparatus for an electronic equipment comprising:
 a secondary battery;
 a first control circuit operatively connected in parallel to said battery and having a first control terminal and a second control terminal, wherein said first control circuit monitors a power supply voltage of said secondary battery, outputs a first control signal from said first control terminal when it is detected that said power supply voltage of said secondary battery is lower than a first predetermined voltage, and outputs a second control signal from said second control terminal when it is detected that said power supply voltage of said secondary battery is higher than a second predetermined voltage;
 a second control circuit for monitoring whether a power is supplied from an external power supply to internal power supply lines of an internal circuit of said electronic equipment, for generating a third control signal when it is detected that the power is supplied from said external power supply to said internal power supply lines of said internal circuit, for outputting said second control signal as said third control signal when it is detected that the power is not supplied from said external power supply to said internal power supply lines of said internal circuit, and for generating said third control signal regardless of whether said second control signal is present, when it is detected that the power is supplied from said external power supply to said internal power supply lines of said internal circuit; and
 a switching circuit section for supplying a power from said secondary battery to said internal power supply lines of said internal circuit of said electronic equipment when the first and third control signals are not present, for electrically disconnecting said secondary battery from said internal power supply lines of said internal circuit in response to the first control signal regardless of the third control signal, and for electrically disconnecting said secondary battery from said internal power supply lines of said internal circuit in response to the third control signal, regardless of the first control signal.

7. A power supply switching apparatus according to claim 6, wherein the power is supplied from said external power supply via an external power supply terminal and an external ground terminal, and a charger unit is connected between a charging terminal and said external ground terminal such that said secondary battery can be charged via said switching circuit.

8. A power supply switching apparatus according to claim 7, further comprising a prevention diode having an anode connected to said external power supply terminal and a cathode connected to a power supply line of said internal power supply lines.

9. A power supply switching apparatus according to claim 7, further comprising a prevention diode having an anode connected to said charging terminal and a cathode connected to a power supply line of said internal power supply lines.

10. A power supply switching apparatus according to claim 6, wherein the power is supplied from said external power supply via an external power supply terminal and an external ground terminal, and a ground line of said internal power supply lines is connected to said external ground terminal, and
 wherein said second control circuit includes:
  a first resistor connected between said external power supply terminal and said external ground terminal;
  an inverter having an input connected to said external power supply terminal;
  a second resistor connected between said second control terminal of said first control circuit and said external ground terminal; and
  an AND gate having an input connected to said second control terminal and an input connected to an output of said inverter, to output said third control signal.

11. A power supply switching apparatus according to claim 10, wherein a charger unit is connected between a charging terminal and said external ground terminal such that said secondary battery can be charged via said switching circuit.

12. A power supply switching apparatus according to claim 10, wherein a positive terminal of said secondary battery is connected to a power supply line of said internal power supply lines, and
 wherein said switching circuit includes:
  a first diode having an anode connected to said negative terminal of said secondary battery;
  a second diode having a cathode connected to a cathode of said first diode and an anode connected to said ground line of said internal power supply lines;
  a first switching element connected to said first diode in parallel and turning off in response to said first control signal; and
  a second switching element connected to said second diode in parallel and turning off in response to said third control signal.

13. A power supply switching apparatus according to claim 12, further comprising a prevention diode having an anode connected to said external power supply terminal and a cathode connected to said power supply line of said internal power supply lines.

14. A power supply switching apparatus according to claim 12, further comprising a prevention diode having an anode connected to said charging terminal and a cathode connected to said power supply line of said internal power supply lines.

15. A power supply switching apparatus according to claim 5, wherein said first control circuit further includes a current detection terminal, wherein said first control circuit detects via said current detection terminal a current flowing from and into said battery, and generates said first and second control signal when the detected current is larger than a predetermined current.

16. A method of switching between power supply for an electronic equipment comprising the steps:
 monitoring a power supply voltage of a battery;
 generating a first control signal when it is detected that said power supply voltage of said battery is lower than a first predetermined voltage;

monitoring whether an external power supply is connected;

generating a second control signal when it is detected that said external power supply is connected;

normally supplying a power from said battery to an internal circuit of said electronic equipment when the first and second control signals are not present;

electrically disconnecting said battery from said internal circuit in response to the first control signal when the second control signal is not present; and electrically disconnecting said battery from said internal circuit in response to the second control signal, regardless of the first control signal.

17. A method according to claim 16, wherein said battery is a secondary battery, and wherein said method further comprises the steps of:

generating a third control signal when it is detected that said power supply voltage of said secondary battery is higher than a second predetermined voltage;

generating said second control signal from said third control signal when it is detected that said external power supply is not connected;

generating said second control signal regardless of whether said third control signal is present, when it is detected that said external power supply is connected.

18. A method according to claim 17, wherein said battery is a secondary battery, and wherein said method further comprises the step of connecting a charging unit for charging said secondary battery.

19. A method according to claim 18, further comprising the steps of:

detecting a current flowing from and into said battery; and generating said first and third control signal when the detected current is larger than a predetermined current.

20. A method according to claim 19, further comprising the step of preventing supply of a power from said battery to a short circuit when said short circuit is formed between terminals to which said external power supply is connected or to which said charging unit is connected.

\* \* \* \* \*